(12) United States Patent
Edwards et al.

(10) Patent No.: US 7,594,048 B1
(45) Date of Patent: Sep. 22, 2009

(54) DETERMINING TRANSIT TIME ACROSS AN ASYNCHRONOUS FIFO MEMORY BY MEASURING FRACTIONAL OCCUPANCY

(75) Inventors: Gareth David Edwards, Edinburgh (GB); David Finlay Taylor, Edinburgh (GB); Duncan Andrew Cockburn, Edinburgh (GB); Douglas Michael Grant, Gorebridge (GB); Stuart Alan Nisbet, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 255 days.

(21) Appl. No.: 11/893,004

(22) Filed: Aug. 14, 2007

(51) Int. Cl.
*G06F 3/00* (2006.01)
(52) U.S. Cl. .............................. 710/52; 710/55; 710/56; 710/57
(58) Field of Classification Search ........................ None
See application file for complete search history.

(56) References Cited

U.S. PATENT DOCUMENTS 5,220,635 A * 6/1993 Kagaya ........................ 710/52
5,390,299 A * 2/1995 Rege et al. .................... 709/234

OTHER PUBLICATIONS

Xilinx, Inc.; Product Specification CPRI v1.1, Aug. 8, 2007, DS611, available from Xilinx, Inc., 2100 Logic Drive, San Jose, California, 95124, pp. 1-4.
Xilinx, Inc.; Product Specification OBSAI v1.1, Aug. 8, 2007, DS612, available from Xilinx, Inc., 2100 Logic Drive, San Jose, California, 95124, pp. 1-4.

* cited by examiner

*Primary Examiner*—Alan Chen
(74) *Attorney, Agent, or Firm*—Kevin T. Cuenot

(57) ABSTRACT

Measuring transit time across an asynchronous first-in-first-out (FIFO) memory can include sampling an indication of a value of a read pointer of the FIFO memory at a sampling frequency that exceeds a frequency of a read clock and a write clock of the FIFO memory. An indication of a value of a write pointer of the FIFO memory can be sampled at the sampling frequency. For each sampling period, a measure of occupancy of the FIFO memory can be calculated according to a sampled pair including the indication of the value of the read pointer and the indication of the value of the write pointer. The measure of occupancy can be averaged over a predetermined number of cycles of the sampling frequency. The averaged measure of occupancy can be output as an indication of transit time across the FIFO memory.

20 Claims, 2 Drawing Sheets

DETERMINING TRANSIT TIME ACROSS AN ASYNCHRONOUS FIFO MEMORY BY MEASURING FRACTIONAL OCCUPANCY

FIELD OF THE INVENTION

The embodiments disclosed herein relate to integrated circuit devices (ICs). More particularly, the embodiments relate to determining delay of an asynchronous first-in-first-out (FIFO) memory.

BACKGROUND OF THE INVENTION

Modern communication systems conform to stringent timing requirements to support reliable data transfer. Wireless infrastructure systems, for example, rely upon strict timing relationships to allow the use of diversity antennas with respect to both transmit and receive components of the system. Strict requirements for delay measurement also are needed to facilitate consistent timing information across different parts of the communication system. Within Common Public Ratio Interface (CPRI) and Open Base Station Architecture Initiative (OBSAI) type communication systems, for example, accuracies on the order of eight nanoseconds may be needed. In other cases, accuracies of approximately two nanoseconds may be needed.

Communication systems, including those supporting CPRI and OBSAI, usually require a mechanism that performs asynchronous, clock domain crossing. A first-in-first-out (FIFO) memory can be used for this purpose. Use of a FIFO memory, however, does present challenges in terms of delay measurement. Conventional methods of determining the transit time across, or through, a FIFO memory, e.g., the delay of signal and/or data propagation across the FIFO memory, are not sufficiently accurate for use with the sorts of communication systems described above where high levels of timing accuracy and delay measurement are needed.

SUMMARY OF THE INVENTION

The embodiments disclosed herein relate to integrated circuits and, more particularly, to determining delay of an asynchronous, first-in-first-out (FIFO) memory. One embodiment of the present invention can include a computer-implemented method of measuring transit time across an asynchronous, FIFO memory. The computer-implemented method can include sampling an indication of a value of a read pointer of the FIFO memory at a sampling frequency. The sampling frequency can exceed a frequency of a read clock and a frequency of a write clock of the FIFO memory. An indication of a value of a write pointer of the FIFO memory can be sampled at the sampling frequency.

For each sampling period, a measure of occupancy of the FIFO memory that depends upon a sampled pair can be determined. The sampled pair can include the indication of the value of the read pointer and the indication of the value of the write pointer. The measure of occupancy can be averaged over a predetermined number of cycles of the sampling frequency. The averaged measure of occupancy can be output as an indication of transit time across the FIFO memory.

In one embodiment, the indication of the value of the read pointer can be the value of the read pointer specified in gray code format. The indication of the value of the write pointer can be the value of the write pointer specified in gray code format. In that case, determining a measure of occupancy can include incrementing a count when the value of only the write pointer changes and decrementing the count when the value of only the read pointer changes. Determining a measure of occupancy further can include leaving the count unchanged when both the value of the read pointer and the value of the write pointer change. Averaging the measure of occupancy can include averaging the count over the predetermined number of cycles of the sampling frequency.

In another embodiment, the indication of the value of the write pointer can be the least significant bit of the value of the write pointer in binary form. The indication of the value of the read pointer can be the least significant bit of the value of the read pointer in binary form. Accordingly, determining a measure of occupancy can include incrementing a count when the least significant bit of the value of only the write pointer changes and decrementing the count when the least significant bit of the value of only the read pointer changes. Determining a measure of occupancy also can include leaving the count unchanged when both the least significant bit of the value of the read pointer and the least significant bit of the value of the write pointer change. Averaging the measure of occupancy can include averaging the count over the predetermined number of cycles of the sampling frequency.

Another embodiment of the present invention can include a system for measuring transit time across an asynchronous, FIFO memory. The system can include at least one register receiving a read pointer of the FIFO memory and at least one register receiving a write pointer of the FIFO memory. The system can include a comparator detecting changes in the read pointer and changes in the write pointer and a counter controlled according to detected changes in the read pointer and the write pointer. An averaging module can be included that calculates and outputs an average of a count of the counter over a predetermined number of cycles of a sampling clock. The average count can indicate the transit time across the FIFO memory.

In one embodiment, the at least one register receiving the read pointer, the at least one register receiving the write pointer, the comparator, the counter, and the averaging module each can be clocked by the sampling clock. The sampling clock can operate at a frequency that exceeds a frequency of a read clock controlling the read pointer and a frequency of a write clock controlling the write pointer.

The read pointer and the write pointer can be specified in gray code format. The comparator can compare successive values of the write pointer in gray code format and successive values of the read pointer in gray code format. The counter can increment the count when only the write pointer changes and can decrement the count when only the read pointer changes. The counter can leave the count unchanged when both the read pointer and the write pointer change.

Another embodiment of the present invention can include a system for measuring transit time across an asynchronous FIFO memory including at least one register receiving a least significant bit of a read pointer of the FIFO memory and at least one register receiving a least significant bit of a write pointer of the FIFO memory. The system further can include a comparator detecting changes in the least significant bit of the read pointer and changes in the least significant bit of the write pointer as well as a counter controlled according to detected changes in the least significant bit of the read pointer and detected changes in the least significant bit of the write pointer. The system can include an averaging module calculating and outputting an average of a count of the counter over a predetermined number of cycles of a sampling clock. The average count can indicate the transit time across the FIFO memory.

In one embodiment, the at least one register receiving the least significant bit of the read pointer, the at least one register receiving the least significant bit of the write pointer, the comparator, the counter, and the averaging module each can be clocked by the sampling clock. The sampling clock can operate at a frequency that exceeds a frequency of a read clock controlling the read pointer and a frequency of a write clock controlling the write pointer.

The read pointer and the write pointer can be specified in binary format. Accordingly, the comparator can compare successive least significant bits of the write pointer and successive least significant bits of the read pointer. The counter can increment the count when the least significant bit of only the write pointer changes and can decrement the count when the least significant bit of only the read pointer changes. The counter can leave the count unchanged when both the least significant bit of the read pointer and the least significant bit of the write pointer change.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to asynchronous, first-in-first-out (FIFO), memories and, more particularly, to determining transit time across such a memory. In general, the occupancy of the FIFO memory can be continuously computed. The occupancy can be sampled at a sampling frequency that may be independent of the read clock and the write clock controlling the FIFO memory. The average occupancy of the FIFO memory can be calculated over a predetermined sample window. The average occupancy of the FIFO memory indicates the transit time of the FIFO memory.

Figure 1:
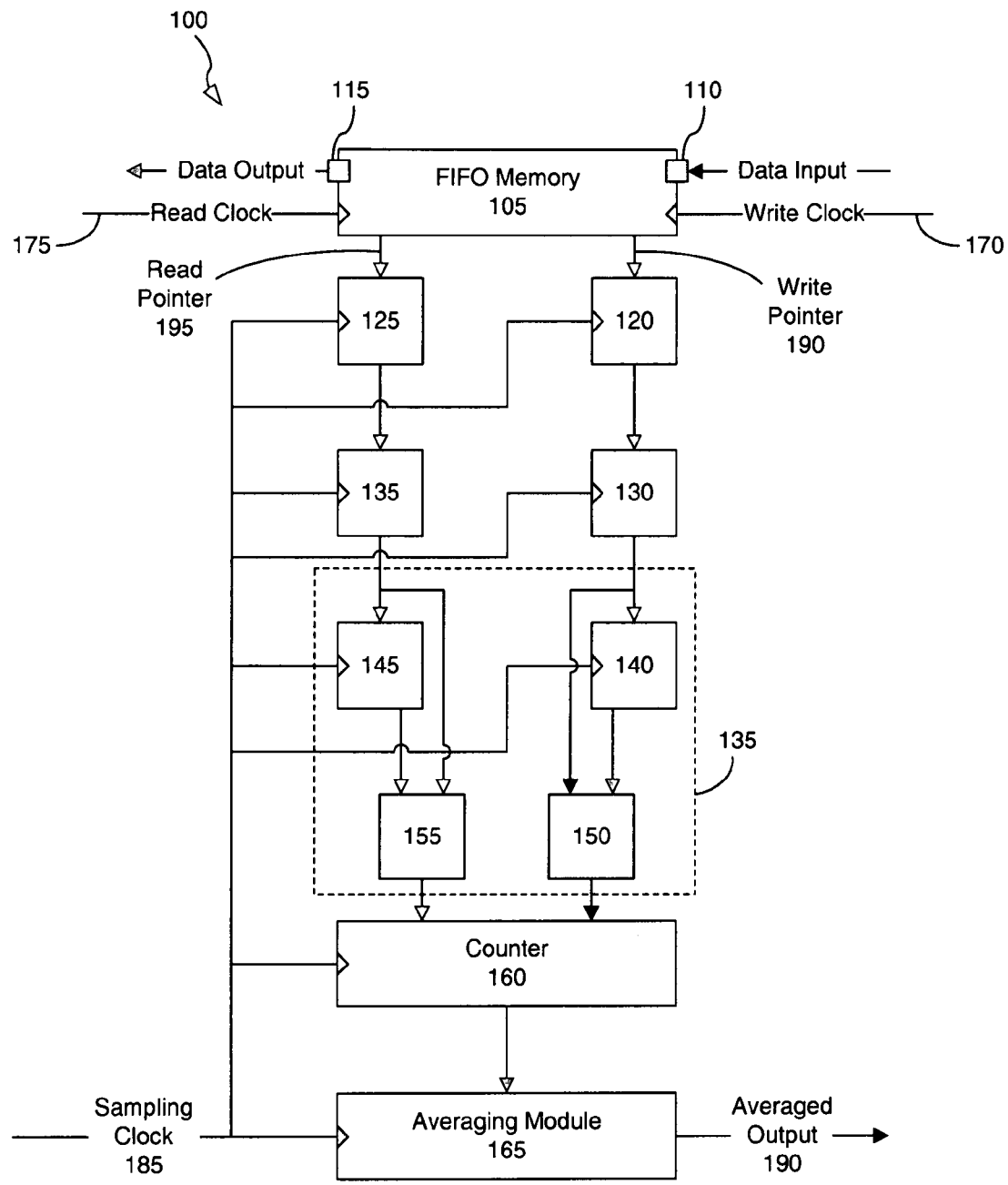
FIG. 1 is a block diagram illustrating a system for determining transit time across an asynchronous, first-in-first-out-memory in accordance with one embodiment of the present invention.

FIG. 1 is a block diagram illustrating a system 100 for determining transit time across an asynchronous, FIFO memory in accordance with one embodiment of the present invention. A FIFO memory 105 can include an input data port 110 and an output data port 115. The FIFO memory 105 further can be coupled to a write clock 170 operating at a write frequency as well as a read clock 175 operating at a read frequency. The write clock 170 can control operation of the write pointer 190 of the FIFO memory 105 and the read clock 175 can control operation of the read clock pointer 195 of the FIFO memory 105.

As known, the write pointer 190 can be incremented on each cycle of the write clock 170. The write pointer 190 can store an address or value indicating a location within the FIFO memory 105 to which data is to be written. The read pointer 195 can be incremented on each cycle of the read clock 175. The read pointer 195 can store an address or value indicating a location within the FIFO memory 105 to which data is to be written. The write pointer 190 and the read pointer 195 can be incremented until such time that each cycles around to the beginning of the FIFO memory 105.

The FIFO memory 105 can function as an interface between two different clock domains. For example, the FIFO memory 105 may be included within a communication system, where the write clock 170 of the FIFO memory 105 and the read clock 175 of the FIFO memory 105 typically operate at the same frequency, but are not derived from the same clock source.

Often, the read clock 175 is generated onboard or local to the FIFO memory 105, while the write clock 170 is recovered from an incoming data stream. Accordingly, the read clock 175 and the write clock 170 typically are not phase related. Further, the frequency of the read clock 175 and the write clock 170 will drift against one another as the communication system continues to operate. Due to the continual drift, the delay of the FIFO memory 105, e.g., the transit time, must be continually measured as the communication system including the FIFO memory 105 operates.

In one embodiment, the system 100 can include a first stage of registers including registers 120 and 125. An indication of the value of the write pointer 190 (hereafter "write pointer") can be written from the FIFO memory 105 to register 120. An indication of the value of the read pointer 195 (hereafter "read pointer") can be written from the FIFO memory 105 to register 125. Both registers 120 and 125 can be clocked according to a sampling clock 185 operating at a given frequency, e.g., the "sampling frequency."

The sampling frequency of the sampling clock 185 can be independent of the frequency of the write clock 170 and the read clock 175 of the FIFO memory 105. The sampling frequency need not be derived from the write clock 170 or the read clock 175. In one embodiment, the sampling frequency need only be higher than the frequency of the write clock 170 of the FIFO memory 105 and higher than the frequency of the read clock 175 of the FIFO memory 105.

In another embodiment, due to various effects upon the write clock 170 and the read clock 175, e.g., jitter and other uncertainties, the sampling frequency can be set high enough so that at least one period of the sampling clock 185 occurs between consecutive cycles of the write clock 170 and consecutive cycles of the read clock 175. The sampling frequency should be set high enough so that two transitions of the write clock 170 or the read clock 175 do not occur without a sample of the write pointer 190 and the read pointer 195 being taken, e.g., loaded into registers 120 and 125 respectively. In one embodiment, the sampling frequency can be set to a value that is approximately 10%, or more, higher than each of the write clock 170 and the read clock 175.

It should be appreciated that specific percentages have been proposed herein for purposes of illustration only and not to suggest or limit the embodiments to any one particular percentage or sampling frequency. The sampling frequency may be any other percentage higher than the write clock 170 and the read clock 175 so long as the constraints described herein are observed.

In another embodiment, system 100 can include a second stage of registers including registers 130 and 135. Each of registers 130 and 135 also can be driven or clocked by the sampling clock 185. The write pointer 190 can be propagated from register 120 to register 130 on successive cycles of the sampling clock 185. The read pointer 195 can be propagated from register 125 to register 135 on successive cycles of the sampling clock 185. Taken collectively, the first stage and the second stage of registers 120-135 double-register the write pointer 190 and the read pointer 195. Double registering can reduce the probability of an indeterminate state being registered and propagated through system 100, thereby increasing the overall stability of system 100.

System 100 further can include a comparator module 135. The comparator module 135 can include registers 140 and 145 as well as comparators 150 and 155. The write pointer 190 can be propagated from register 130 to register 140. Register 140 can serve as a delay that delays the write register 190 by one cycle of the sampling clock 185. Comparator 150 can receive the write pointer 190 from register 130 and a delayed version of the write pointer 190 from register 140. Comparator 150 can compare the write pointer 190 with the delayed write pointer 190 to determine whether a change in the write pointer 190 has occurred.

Similarly, the read pointer 195 can be propagated from register 135 to register 145. Register 145 can function as a delay, which delays the read pointer 195 by one cycle of the sampling clock 185. Comparator 155 can receive the read pointer 195 from register 135 and a delayed version of the read pointer 195 from register 145. Comparator 155 can compare the read pointer 195 with the delayed read pointer 195 to determine whether a change in the read pointer 195 has occurred.

Each of comparators 150 and 155 can provide an output to counter 160. Comparator 150 can output a signal to counter 160 that indicates when the write pointer 190 changes or has changed. Comparator 155 can output a signal to counter 160 that indicates when the read pointer 195 changes or has changed.

Counter 160, also driven by the sampling clock 185, can receive the output from each of comparators 150 and 155. Counter 160 can store a count value (count). The counter 160 can be configured to increment the count when only the write pointer 190 changes as indicated by the signal output from comparator 150. Counter 160 can be configured to decrement the count when only the read pointer 195 changes as indicated by the signal output from comparator 155. When both the write pointer 190 and the read pointer 195 change, the counter 160 can be configured leave the count unchanged, e.g., not increment the count. Similarly, when neither the write pointer 190 nor the read pointer 195 change, the counter 160 can be configured to leave the count unchanged.

An averaging module 165 can be coupled to the counter 160 and clocked by the sampling clock 185. The count stored within the counter 160 can be provided to the averaging module 165 each cycle of the sampling clock 185. The averaging module 165, being clocked by the sampling clock 185, can average the count over a predetermined number of cycles of the sampling clock 185. The averaging module 185 can output the averaged count 180. The averaged count 180, e.g., the average occupancy of the FIFO memory 105, indicates the transit time of the FIFO module 105. For example, the average occupancy, as measured in read/write clock cycles of the FIFO memory 105, can be multiplied by the nominal period of the read/write clock to indicate transit time. As used herein, "outputting" can include, but is not limited to, writing to a file, writing to a user display or other output device, playing audible notifications, sending or transmitting to another system, exporting, or the like.

In one embodiment, the indication of the value of the write pointer 190 and the indication of the value of the read pointer 195 that is passed to registers 120 and 125 respectively can be the actual value of each respective pointer. The value of the write pointer 190 can be passed to register 120 and the value of the read pointer 195 can be passed to register 125. Both the value of the write pointer 190 and the value of the read pointer 195 can be specified using gray code. The use of gray code results in only a single bit changing when the write pointer 190 and/or the read pointer 195 is incremented, thereby reducing the uncertainty in system 100.

In another embodiment, the value of the write pointer 190 and the value of the read pointer 195 can be specified in binary format. In that case, rather than propagating the entire value of the write pointer 190 and the entire value of the read pointer 195, only the least significant bit of each pointer need be obtained, e.g., sampled, and propagated. Accordingly, the least significant bit of the write pointer 190 can be loaded into register 120 and propagated. Similarly, only the least significant bit of the read pointer 195 can be loaded into register 125 and propagated. This embodiment further provides benefits similar to those attained using gray code where only a single bit changes when the state of either pointer changes.

The embodiment in which the entire write pointer 190 value and the entire read pointer 195 value are propagated will require a greater bit width than the case in which only the least significant bit is sampled. Thus, more registers at each respective stage of system 100 up to the counter 160 will be needed and depend upon the width of the pointers, e.g., one register for each bit. The embodiment in which only the least significant bit of each pointer is propagated reduces the bit width of each stage to a single bit for each pointer and, thus, the size of system 100.

Figure 2:
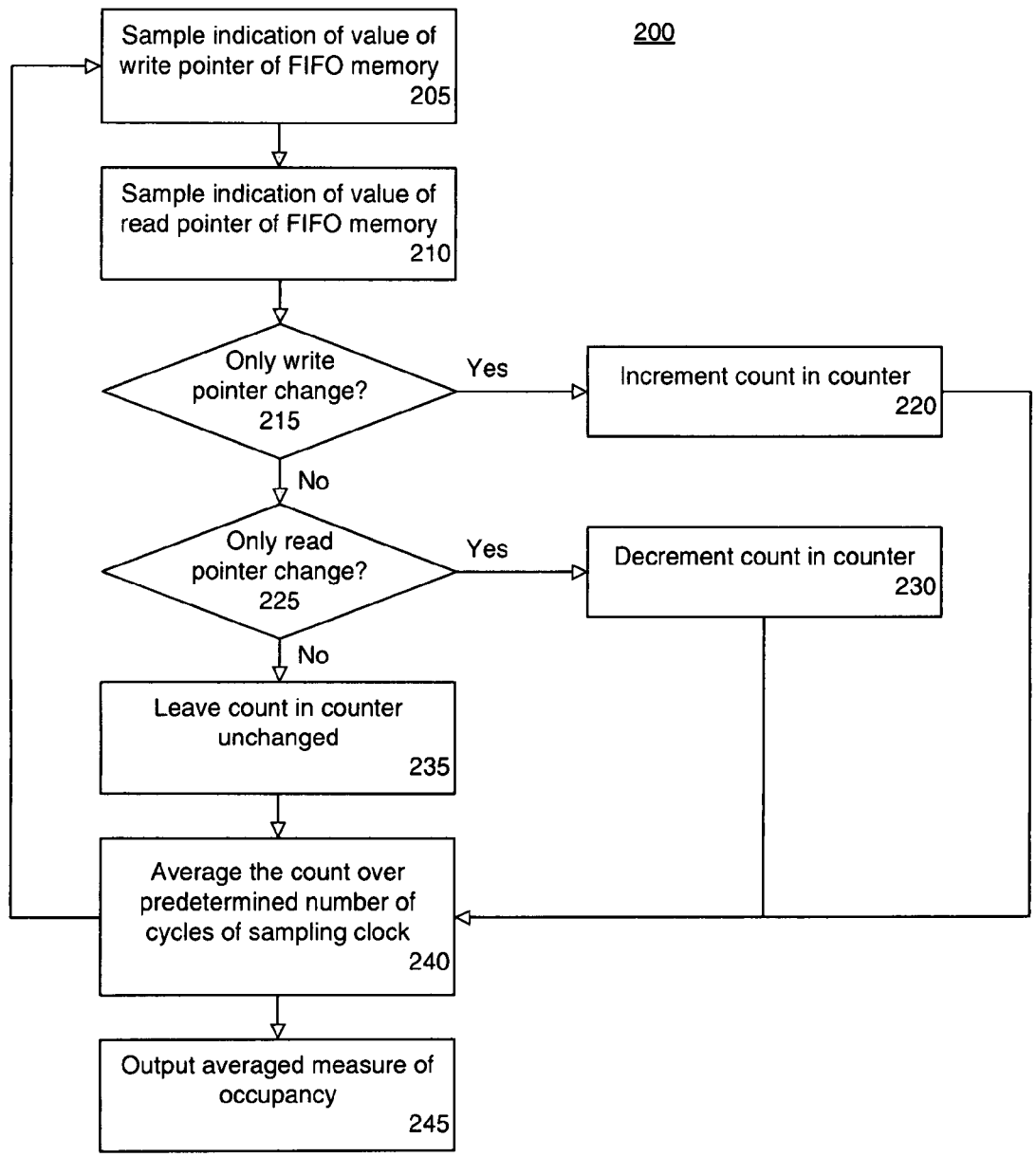
FIG. 2 is a flow chart illustrating a method of determining transit time across an asynchronous, FIFO memory in accordance with another embodiment of the present invention.

FIG. 2 is a flow chart illustrating a method 200 of determining transit time across an asynchronous, FIFO memory in accordance with another embodiment of the present invention. The method 200 can be performed using a system such as the system described with reference to FIG. 1. The method 200 can begin in step 205 where an indication of the value of the write pointer of the FIFO memory can be sampled. In step 210, an indication of the value of the read pointer of the FIFO memory can be sampled.

As noted, in one embodiment, the indication of the value of the write pointer and the read pointer can be the actual value of each respective pointer specified using gray code format. In another embodiment, the indication of the value of the write pointer and the read pointer can be the least significant bit of each respective pointer specified in binary format. Both the write pointer and the read pointer can be sampled via double registering at a specified sampling frequency. At each cycle of the sampling frequency, another sample pair, including a sample of the write pointer and a sample of the read pointer, can be taken and propagated through to the comparator module.

Beginning in step 215, a measure of fractional occupancy of the FIFO memory can be calculated. A count in a counter can be incremented, decremented, or left unchanged according to whether the write pointer and/or read pointer changes from one sampling cycle to the next. As the sample clock operates at a frequency that exceeds both the write clock and the read clock of the FIFO memory, the count, which reflects the occupancy of the FIFO memory, can be said to be fractional.

In step 215, a determination can be made as to whether only the write pointer changed with respect to a current sample pair of the write pointer and the read pointer. If so, the method can continue to step 220 where the count in the counter can be incremented. If not, the method can proceed to step 225. In step 225, a determination can be made as to whether only the read pointer changed with respect to a current sample pair of the write pointer and the read pointer. If so, the method can proceed to step 230 where the count in the counter can be decremented. If not, the method can continue to step 235. In step 235, the count in the counter can be left unchanged as either both the write pointer and the read pointer changed or neither the write pointer nor the read pointer changed.

In step 240, the count in the counter can be averaged with one or more prior count values. The count can be averaged over a selected number of cycles of the sampling frequency. The averaged count can be output in step 245. It should be appreciated that as the averaged count is output, the method further can loop back to step 205 to continue sampling further indications of the write and read pointer values of the FIFO memory.

Embodiments of the present invention can be realized in hardware, software, or a combination of hardware and software. The flowchart in the figure further illustrates an architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of measuring transit time across an asynchronous, first-in-first-out (FIFO) memory, the method comprising:
    sampling an indication of a value of a read pointer of the FIFO memory at a sampling frequency, wherein the sampling frequency exceeds a frequency of a read clock and a frequency of a write clock of the FIFO memory;
    sampling an indication of a value of a write pointer of the FIFO memory at the sampling frequency;
    for each sampling period, determining a measure of occupancy of the FIFO memory that depends upon a sampled pair comprising the indication of the value of the read pointer and the indication of the value of the write pointer;
    averaging the measure of occupancy over a predetermined number of cycles of the sampling frequency; and
    outputting the averaged measure of occupancy as an indication of transit time across the FIFO memory.

2. The computer-implemented method of claim 1, wherein the indication of the value of the read pointer is the value of the read pointer specified in gray code format and the indication of the value of the write pointer is the value of the write pointer specified in gray code format, wherein determining a measure of occupancy further comprises:
    incrementing a count when only the value of the write pointer changes; and
    decrementing the count when only the value of the read pointer changes.

3. The computer-implemented method of claim 2, wherein determining a measure of occupancy further comprises leaving the count unchanged when both the value of the read pointer and the value of the write pointer change.

4. The computer-implemented method of claim 3, wherein averaging the measure of occupancy further comprises averaging the count over the predetermined number of cycles of the sampling frequency.

5. The computer-implemented method of claim 1, wherein the indication of the value of the write pointer is the least significant bit of the value of the write pointer in binary form, wherein the indication of the value of the read pointer is the least significant bit of the value of the read pointer in binary form.

6. The computer-implemented method of claim 5, wherein determining a measure of occupancy further comprises:
    incrementing a counter when the least significant bit of the value of only the write pointer changes; and
    decrementing the counter when the least significant bit of the value of only the read pointer changes.

7. The computer-implemented method of claim 6, wherein determining a measure of occupancy further comprises leaving the counter unchanged when both the least significant bit of the value of the read pointer and the least significant bit of the value of the write pointer change.

8. The computer-implemented method of claim 7, wherein averaging the measure of occupancy further comprises averaging the count over the predetermined number of cycles of the sampling frequency.

9. A system for measuring transit time across an asynchronous, first-in-first-out (FIFO) memory, the system comprising:
    at least one register receiving a read pointer of the FIFO memory;
    at least one register receiving a write pointer of the FIFO memory;
    a comparator detecting changes in the read pointer and changes in the write pointer;
    a counter controlled according to detected changes in the read pointer and the write pointer; and
    an averaging module calculating and outputting an average of a count of the counter over a predetermined number of cycles of a sampling clock, wherein the average count indicates transit time across the FIFO memory.

10. The system of claim 9, wherein the at least one register receiving the read pointer, the at least one register receiving the write pointer, the comparator, the counter, and the averaging module each is clocked by the sampling clock operating at a frequency that exceeds a frequency of a read clock controlling the read pointer and a frequency of a write clock controlling the write pointer.

11. The system of claim 9, wherein the read pointer and the write pointer are specified in gray code format.

12. The system of claim 11, wherein the comparator compares successive values of the write pointer in gray code format and successive values of the read pointer in gray code format.

13. The system of claim 9, wherein the counter increments the count when only the write pointer changes and decrements the count when only the read pointer changes.

14. The system of claim 13, wherein the counter leaves the count unchanged when both the read pointer and the write pointer change.

15. A system for measuring transit time across an asynchronous, first-in-first-out (FIFO) memory, the system comprising:
- at least one register receiving a least significant bit of a read pointer of the FIFO memory;
- at least one register receiving a least significant bit of a write pointer of the FIFO memory;
- a comparator detecting changes in the least significant bit of the read pointer and changes in the least significant bit of the write pointer;
- a counter controlled according to detected changes in the least significant bit of the read pointer and detected changes in the least significant bit of the write pointer; and
- an averaging module calculating and outputting an average of a count of the counter over a predetermined number of cycles of a sampling clock, wherein the average count indicates transit time across the FIFO memory.

16. The system of claim 15, wherein the at least one register receiving the least significant bit of the read pointer, the at least one register receiving the least significant bit of the write pointer, the comparator, the counter, and the averaging module each is clocked by the sampling clock operating at a frequency that exceeds a frequency of a read clock controlling the read pointer and a frequency of a write clock controlling the write pointer.

17. The system of claim 15, wherein the read pointer and the write pointer are specified in binary format.

18. The system of claim 15, wherein the comparator compares successive least significant bits of the write pointer and successive least significant bits of the read pointer.

19. The system of claim 15, wherein the counter increments the count when the least significant bit of only the write pointer changes and decrements the count when the least significant bit of only the read pointer changes.

20. The system of claim 15, wherein the counter leaves the count unchanged when both the least significant bit of the read pointer and the least significant bit of the write pointer change.

* * * * *